United States Patent Office 3,146,165
Patented Aug. 25, 1964

3,146,165
COMPOSITION CONTAINING COBALAMIN AND GLUTATHIONE AND PROCESS OF EMPLOYING SAME
John Godfrey Heathcote, Grange Park, St. Helens, England, assignor to The Distillers Company Limited, Edinburgh, Scotland, a British company
No Drawing. Filed Aug. 28, 1961, Ser. No. 134,089
Claims priority, application Great Britain Aug. 26, 1960
2 Claims. (Cl. 167—81)

The present invention relates to a cobalamin-glutathione composition, and in particular to a cobalamin-gultathione composition effective on oral administration against pernicious anaemia.

It is already known that cobalamins, for example cyanocobalamin and hydroxocobalamin, are of great value when administered parenterally in the treatment of pernicious anaemia, but are much less effective on oral administration.

It is an object of the present invention to provide a cobalamin-glutathione composition which is effective on oral administration against pernicious anaemia, as well as on parenteral administration.

Accordingly the present invention is a composition which comprises cobalamin mixed with glutathione.

The composition can be suitably prepared, for example, by triturating in the dry state crystalline cobalamin and glutathione. For good results thorough grinding is required.

As cobalamin, any physiologically active form of cobalamin may be used, for example cyanocobalamin, hydroxocobalamin, or nitritocobalamin. Mixtures of two or more cobalamins may be employed. It is particularly preferred to use cyanocobalamin, hydroxocobalamin and mixtures thereof.

The ratio of cobalamin to glutathione in the composition may vary widely. Generally, a weight for weight ratio of glutathione to cobalamin of between 1:1 and 20:1 is preferred. A ratio of 10:1 is particularly preferred.

For oral administration, the composition may if desired be suitably diluted with any of the commonly used pharmaceutical solid diluents, and presented in tablet form. Tablets containing 40 to 100 $\mu$g. of the cobalamin component are particularly suitable. Alternatively, the composition may be presented in liquid form, in which case any suitable liquid diluent such as water may be used.

Where the composition is to be administered by parenteral injection, it may be dissolved in any of the usual sterile liquid diluents used in the art, for example sterile water, with appropriate adjustment of pH.

The present invention is further exemplified by the following example:

EXAMPLE 10 parts by weight of glutathione and 1 part by weight of crystalline cyanocobalamin were triturated together into a fine powder.

This powder was suitably made into tablet form using mannitol as the vehicle.

The preparation was orally administered to a pernicious anaemia patent. The patient was previously treated with oral doses of crystalline cyanocobalamin. The results of both the crystalline cyanocobalamin treatment and the cyanocobalamin/glutathione treatment are shown by way of comparison in Table 1. It will be seen that the orally administered cyanocobalamin/glutathione preparation gave results superior to those obtained with orally administered cyanocobalamin alone, as demonstrated by the steady increase in the haemoglobin value and continued rise in packed cell volume when the cyanocobalamin/glutathione treatment was started, coupled with a further and larger reticulocytosis.

Similar compositions may be prepared according to the above example by substituting different cobalamins for cyanocobalamin.

Table 1

| Day | Haemoglobin, percent | Packed cell volume, percent | Reticulocytes, percent | Oral treatment (daily) |
|---|---|---|---|---|
| 1 | 60 | 26 | 1.0 | 60 $\mu$g. crystalline cyanocobalamin. |
| 4 | | | 1.0 | Do. |
| 6 | 63 | 27 | 5.0 | Do. |
| 9 | 63 | 27 | 2.5 | Do. |
| 12 | 62 | 28 | 2.3 | 60 $\mu$g. $B_{12}$ as the cyanocobalamin/glutathione preparation. |
| 14 | 67 | 28 | 5.8 | Do. |
| 16 | 73 | 30 | 6.8 | Do. |
| 19 | 72 | 30 | 2.7 | Do. |

I claim:

1. A composition of matter efficient on oral administration against pernicious anemia, said composition in dosage unit form consisting essentially of glutathione and cobalamin, the ratio of the weight of the glutathione component to the weight of the cobalamin component being between 1:1 and 20:1.

2. A process useful in the treatment of a person having pernicious anemia which comprises orally administering to said person per unit dose glutathione and cobalamin, the ratio of the weight of the glutathione component to the weight of the cobalamin component being between 1:1 and 20:1.

References Cited in the file of this patent

UNITED STATES PATENTS 2,662,048     Winsten     Dec. 8, 1953

OTHER REFERENCES

Greenberg: Nature, volume 180, No. 4599, December 21, 1957, pages 1401 and 1402 (167–81 $B_{12}$ comp.).

Heinrich: Vitamin $B_{12}$ and Intrinsic Factor, 1957, Ferdinand Enke Verlag Stuttgart, pages 127–132.